UNITED STATES PATENT OFFICE.

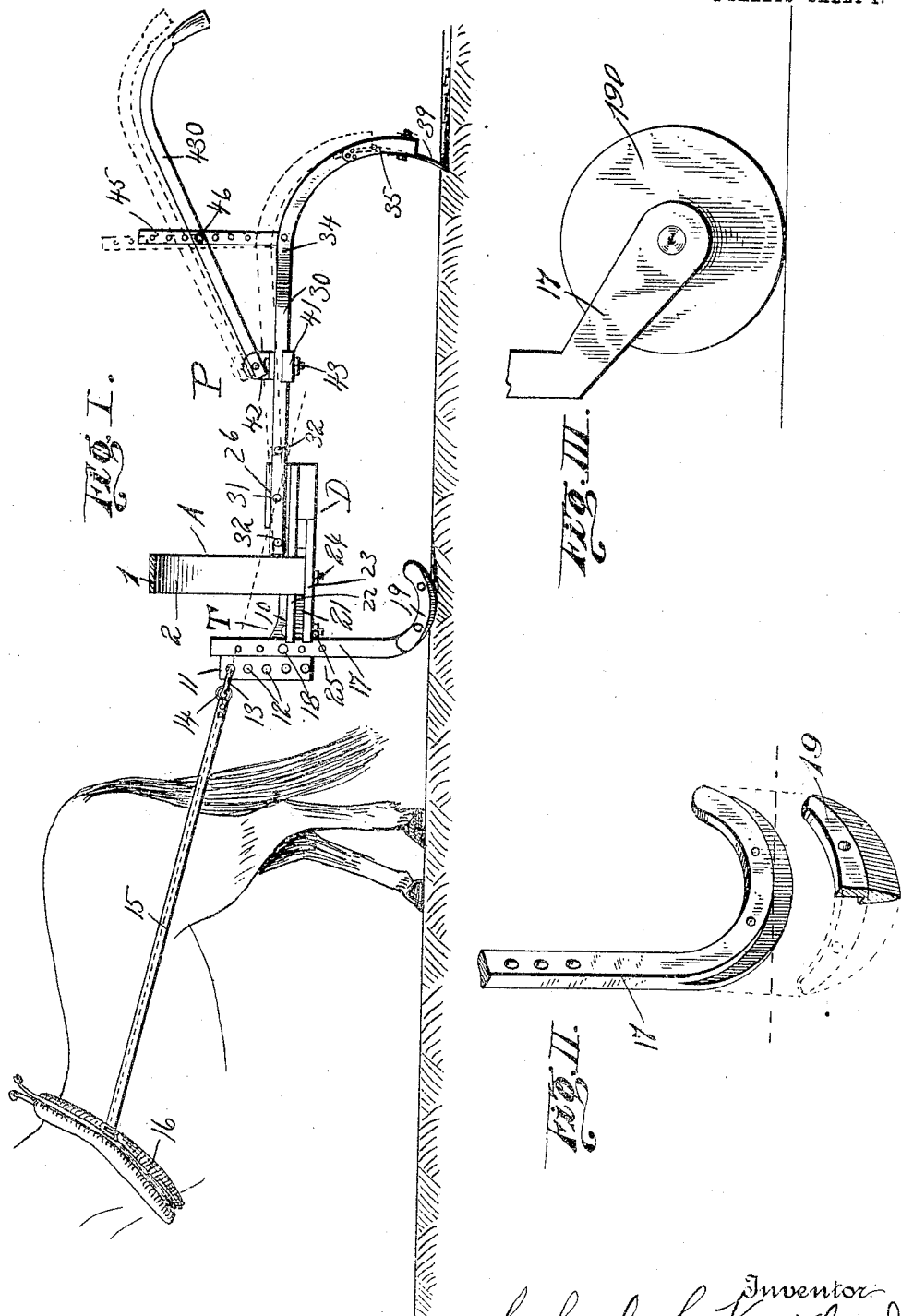

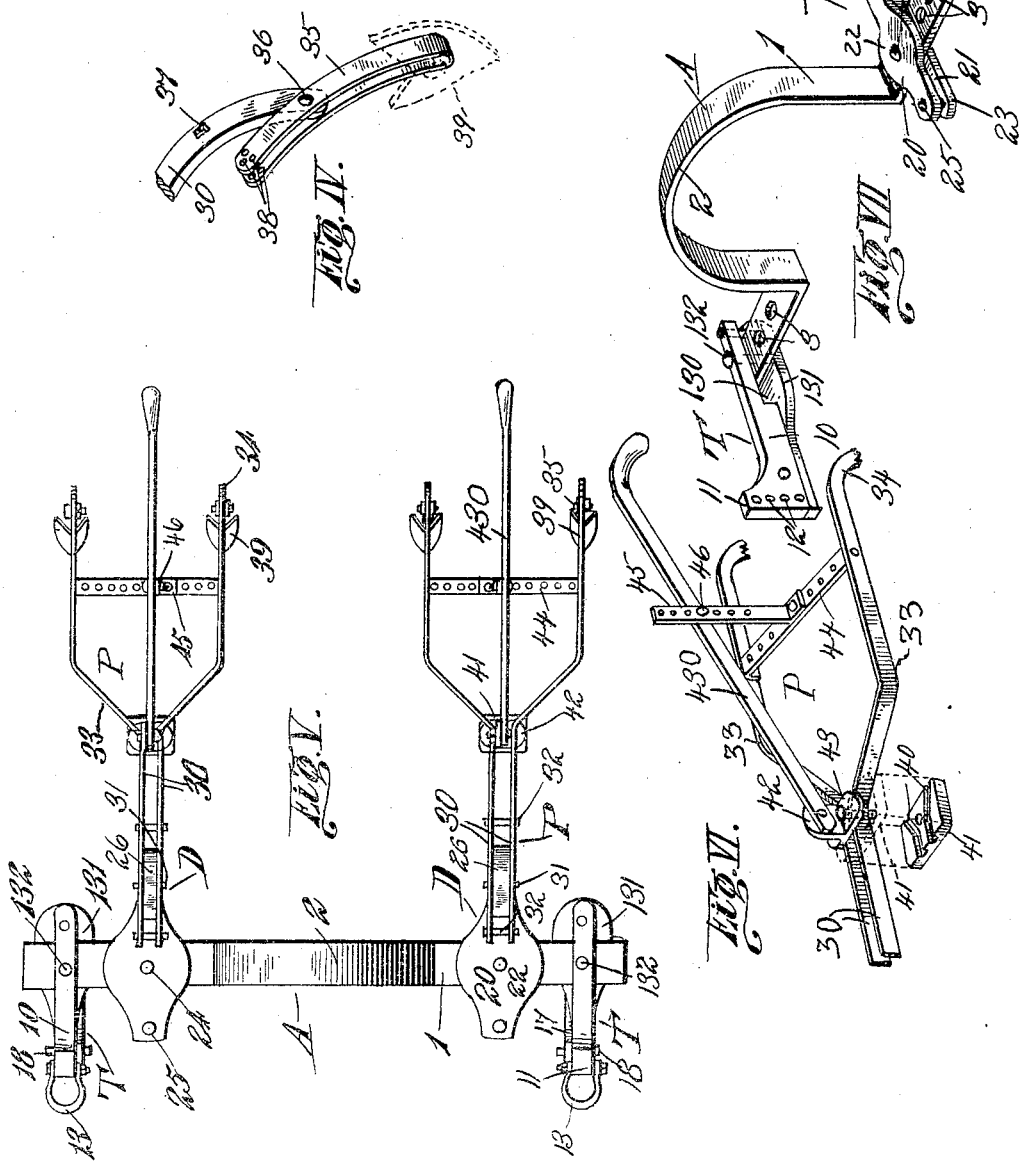

CHARLES C. KIRKLAND, OF MORRISVILLE, NEW YORK.

CULTIVATOR.

No. 805,078. Specification of Letters Patent. Patented Nov. 21, 1905.

Application filed November 17, 1904. Serial No. 233,387.

*To all whom it may concern:*

Be it known that I, CHARLES C. KIRKLAND, a citizen of the United States, and a resident of Morrisville, Madison county, State of New York, have invented certain new and useful Improvements in Cultivators; and my preferred manner of carrying out the invention is set forth in the following full, clear, and exact description, terminating with claims particularly specifying the novelty.

This invention belongs to the general class of agricultural machines known as "plows" and to the subclass thereunder known as "parallel cultivators;" and the object of the same is to produce a cultivator of this type useful for straddling a row of growing plants, so constructed that it will be substantially balanced, and thus avoid constant work by the operator, and having a flexible connection between its plow-beams and their draft-beams whereby either gang of shovels can be raised when necessary to pass over an obstruction.

To this end the invention consists in the details of construction hereinafter described, and illustrated in the accompanying drawings, wherein—

Figure I is a longitudinal section through this machine as it appears in use, a horse being shown in outline for the purpose of indicating the line of the draft, and the handle and plow-beam being shown in dotted lines as raised. Fig. II shows the preferred form of the runner in perspective as more useful on sidehills. Fig. III shows a modification of the same which employs a wheel as more useful on level ground. Fig. IV is a detached view of one of the shovel-standards, showing details of its construction and adjustment and illustrating the break-pin. Fig. V is a plan view of the machine complete. Fig. VI shows the details by which the handles are rendered adjustable. Fig. VII is a perspective view of the arch, showing the shape of one tongue and one draft-beam and their manner of adjustable attachment to the arch.

This machine is a two-horse cultivator for sidehill or level ground, with two sets or gangs of shovels adapted to cultivate the earth on either side of a row of plants which is straddled by the arch. Each gang has its handle, and one or both of these handles are manipulated by the operator. The relative sizes and disposition of parts are such that under ordinary circumstances the machine is balanced and the handles need no especial attention from the operator, who is therefore enabled to walk between the rows or astride one row of plants. Aside from the attention given to details in the following specification the principal feature of this invention may be said to be such construction of its elements as will produce this balancing and also such construction of its guide mechanism as will cause it to follow the horses whether the machine is used on level ground or on a sidehill.

The principal elements of this invention are one cross-beam and arch A, two tongue members T, two draft-beams D, and two plow-beams P. I will take up these several elements individually and describe them in connection with the details belonging, respectively, to them.

The transverse member (best seen in Fig. VII and which I call the "arch" A) consists of a substantially horizontal beam 1, whose center is bent up at 2 in the shape of an arch and whose horizontal end portions are provided with a series of holes 3. This member may well be a strip of metal flat in cross-section, as shown in the drawings; but for the purposes of this specification it is called a "beam." The reason for making this beam of metal flat in cross-section is because it can be made lighter and will resist the strain which comes edgewise upon it.

The tongue members T are in duplicate and a description of one will suffice for both. The body 10 of each tongue member has considerable upright dimension and is raised at its front end 11 and provided there with a series of holes 12, into one of which (above the plane of the pivot 31, described below) may be adjustably secured a clevis 13, carrying the swingletree 14, from which the tugs or traces 15 lead to the horse's collar 16. 17 is the runner bolted at 18 to this tongue member in such manner that it may be adjusted, and at its lower end this runner has a shoe 19, adapted to travel upon and to cut slightly into the earth at a point back of the draft and almost directly under the front edge of the arch. In Fig. III a wheel 190 is shown as substituted for this shoe, which wheel may be used on level ground, although it is mounted in a shank 17, which is the equivalent of the runner-shank and is adjustable in the same way. At its rear end this tongue member is slotted horizontally, as at 130, its portion 131 beneath the slot being rather wide and extending under the flat end 1 of the arch, and a vertical bolt 132 takes through the forked rear end of this member and through one of the holes 3 in the arch. The purpose of this wide portion is to give strength to the connection between these parts and prevent tipping. Of the draft-beams D there are also two of like construction. Each comprises a body 20, forked or slotted horizontally at its front end, as 21, and having a wide plate 22 above and a narrow one, 23, below this slot. Also for the purpose of affording a strong connection between the draft-beam and the horizontal portion of the arch and preventing tipping a vertical bolt 24 takes through the center of this wide portion and one of the holes 3 in one end of the arch. The front extremities of this fork may be connected by a strengthening-bolt 25. 26 is a block secured rigidly upon the top of the draft-beam slightly in rear of its point of connection 24 with the arch, and hence slightly in rear of the point where the runner rests upon the ground. In length the draft-beam is about nine inches. There are also two duplicate plow-beams P, of which each is constructed as follows: 30 30 are parallel strips standing on edge and with their forward ends extending astride the block 26, to which they are pivoted at 31 in such position that their lower edges do not rest upon the top of the draft-beam, and therefore these strips have a little freedom of movement around their pivot. For strengthening purposes these strips may be connected with each other, as at 32, in front and rear of the block. Extending thence to the rear they are bent substantially as shown at 33, whence they diverge from each other and are finally turned down, as at 34, for the attachment of the shovels in a suitable manner.

By preference the shovel members are constructed as best seen in Fig. IV. 35 is a shovel-support pivoted between its ends at 36 to the lower end of each of the strips 30, the latter being provided a little above the pivot with a longitudinal slot 37. The upper end of the support 35 has a series of holes 38, preferably arranged in staggered relation to each other, yet so as to register with the slot 37, and through any one of these holes may be put a bolt or a break-pin, whereby the support and the shovel can be adjusted with reference to the plow-beam, and yet if too great an obstruction is encountered by the shovel the break-pin would be shattered before the parts would be broken. Said support 35 is by preference a strip doubled upon itself, so as to stand astride the plow-beam, where it is bolted to it, and the shovel 39 is connected with the lower end of this support in any suitable manner. The shape of this shovel will be such as necessity may demand, differing somewhat according to the size and nature of the plants to be treated.

While any suitable form of handle may be employed, I prefer that best shown in Fig. VI. Where the strips 30 are bent and diverge outward they pass through grooves 40 in the upper side of a plate 41, which hold them properly spaced. Upon their upper edges rests the horizontal portion of a T-shaped member 42, and a bolt 43 passes downward through this horizontal portion and through the plate 41, so as to clamp the parts together. To the upright portion of said memer 42 is bolted the front end of the handle 430. Between the separated portions 33 of the strips stands a transverse member 44, its end bolted to the strips and its body provided with perforations, and to one of the latter is bolted the foot of an L-shaped member 45, whose upright body is perforated, as shown. Finally, 46 is a bolt taking through one of these perforations in the L-shaped member and through the handle 430. By this construction it will be seen that the handle can be raised or lowered by adjusting the bolt 46, and it can be adjusted to either side by adjusting the connection of the foot of the L-shaped member 45 with the transverse member 44, the pivotal connection between the T-shaped member 42 and the plate 41 permitting a horizontal adjustment of the handle and the pivotal connection between the latter and the upright portion of the T-shaped member permitting a vertical adjustment of the handle. I wish to emphasize the fact that while these details are preferable in a machine of this character they are not absolutely necessary; so, also, with the details of construction of the shovels. The length of the plow-beams may be such as desired; but the pivot-bolt 31 between them and the block 26 is only about an inch above the top of the draft-beam and from two to six inches in rear of the point where the runner contacts with the earth. The tongue members are about nine inches in length. I give these relative proportions for the better understanding of what follows.

With a cultivator constructed as above described the clevis 13 is adjusted into the proper hole 12 in the tongue member to bring it in line between the point of draft on the collar 16 and the pivot 31 between the draft-beam and the plow-beam, as indicated by the dotted line in Fig. I. I have found by experiment that if the parts are properly proportioned the result of the draft applied in this manner is just sufficient upward tendency of the rear end of the draft-beam (rocking, as it were, over the supporting-point of the runner) to throw up the front ends of the plow-beams despite the drag occasioned by the shovels in performing their ordinary labor. If one or more of the shovels of either gang become fouled on a stone or other obstruction, the operator by lifting its handle can elevate all the shovels of that gang. The result of this motion is to turn that plow-beam on its pivot 31, as indicated in dotted lines in Fig. I, and with the gang of shovels raised the horse at that side of the machine is doing no work.

However, as the horse at the other side of the machine progresses, and the balance of the gang at that side is maintained, the pivot 31 of the raised gang cannot descend without twisting the arch, which is of course made sufficiently strong to prevent it. Hence I have learned by actual experience that the balance of this machine will be maintained and the parts will remain in the full-lined position of Fig. I, whether both of the gangs of shovels are being used or one of them is raised and temporarily idle.

What is claimed as new is—

1. In a cultivator, the combination with the draft mechanism, the plow-beam, and a flexible connection between them; of a support for and approximately beneath said point of connection, and means for attaching the power to the draft mechanism.

2. In a cultivator, the combination with the draft mechanism, the plow-beam, and a flexible connection between them; of a support for and approximately beneath said point of connection, and means for attaching the power to the draft mechanism at a point above the plane of the connection.

3. In a cultivator, the combination with the draft mechanism, the plow-beam, and a flexible connection between them; of a support for and approximately beneath said point of connection, a tongue connected with the draft mechanism and having a raised front end, and means for attaching the power to said front end at a point above the plane of the connection.

4. In a cultivator, the combination with the draft mechanism, the plow-beam, and a flexible connection between them; a tongue connected with the draft mechanism and having a raised front end, and means for attaching the power to said front end at a point above the plane of the connection.

5. In a cultivator, the combination with the draft mechanism having a raised block, means for attaching the power at a point above the block, and a supporting-runner adapted to travel on the earth at a point back of the draft and slightly forward of said block; of a plow-beam flexibly connected to the block by a pivot, and a shovel carried by said beam, the parts being of such relative proportion that when the machine is in motion said pivot will remain raised, substantially as described.

6. In a cultivator, the combination with the draft mechanism having a raised block, an upright with a series of holes at its front end, and a supporting-runner adjustably connected with said end and adapted to travel on the earth at a point back of the draft and slightly forward of said block; of a plow-beam flexibly connected to the block and a shovel carried by said beam, the parts being of such relative proportion that when the machine is in motion said pivot will remain raised, substantially as described.

7. In a parallel cultivator, the combination with a transverse arch, two members secured thereto and having means for attaching the power at points above the ends of the arch, and a supporting-runner carried by each member and adapted to travel on the earth at a point almost under the front edge of the arch; of two draft-beams secured to the arch, two plow-beams with their respective shovels, and a flexible pivotal connection between each plow-beam and its draft-beam, the parts being so arranged that when the machine is in motion the point of pivotal connection will remain raised.

8. In a parallel cultivator, the combination with a transverse arch, two tongue members secured thereto and having means for attaching the power at points above the ends of the arch, and a supporting-runner carried by each tongue member and adapted to travel on the earth at a point almost under the front edge of the arch; of two draft-beams secured to the arch and each carrying a raised block, two plow-beams with their respective shovels, and a pivot passing through each plow-beam and the block of its respective draft-beam at a point to leave a certain flexibility between them, the parts being of such relative proportion and said flexibility such that when the machine is in motion the pivot will remain raised.

9. In a parallel cultivator, the combination with a transverse arch, two draft-beams secured thereto and each having a raised block, and two gangs of plow-beams flexibly connected respectively to said blocks; of a transverse arch, two members secured thereto and having raised front ends pierced with a hole, means for attachment of the power to said hole so that the line of draft if projected through it would intersect the pivot of the plow-beams, and means for supporting said members from the earth at points just forward of said pivots, as and for the purpose set forth.

10. In a parallel cultivator, the combination with an arch, two draft-beams secured thereto and two plow-beams connected with the draft-beams; of runners connected with the ends of the arch and having shoes adapted to contact with the earth just forward of said points of connection, and means for connecting the power with each end of the arch in a plane above the latter.

11. In a parallel cultivator, the combination with an arch member composed of a flat beam with horizontal extremities, and the draft-beams and plow-beams connected with said ends; of two members each horizontally slotted at its rear end for the reception of the end of the arch, that portion below the latter being wider than that above, the forward end of each member having means for the attachment of the draft at a point above the end of the arch, and a supporting-runner connected therewith.

12. In a parallel cultivator, the combination with an arch member composed of a flat beam with horizontal extremities, means for supporting said ends, and means for connecting the draft-animals therewith at points above said extremities; of two draft-beams each forked at its front end to embrace the end of the arch, that portion above the latter being wider than that portion below, and a plow-beam connected with each draft-beam.

13. In a parallel cultivator, the combination with a transverse arch, means for supporting its extremities, and means for attaching the draft; of two draft-beams secured to said extremities and each having a raised block, and two plow-beams each consisting of parallel upright strips diverging downward at their rear ends to carry the shovels, their forward ends passing astride said blocks respectively and pivoted thereto so as to have a certain flexibility of motion vertically on the draft-beam, and strengthening-bolts through said strips in front and in rear of the blocks.

14. In a cultivator, a plow-beam having its rear end bent downward and provided with a slot, a shovel-support pivoted to the lower extremity of said beam and having a series of holes arranged in staggered relation to each other and all adapted to register with said slot for the reception of a pin, and a shovel carried by said support.

15. In a cultivator, the plow-beam consisting of upright strips which diverge toward the rear and carry the shovels at their rear extremities, a transverse member connecting said strips, an L-shaped member adjustable on said transverse member, and a handle flexibly connected at its front end with said strips and vertically adjustable where it crosses said L-shaped member.

16. In a cultivator, the plow-beam consisting of upright strips which diverge toward the rear and carry the shovels at their rear extremities, a plate beneath said strips at their point of divergence, a T-shaped member above, a bolt connecting said plate and member to clamp all parts together, a handle pivoted to said T-shaped member, and means for adjustably supporting the handle from the rear portions of said strips.

17. In a cultivator, the plow-beam consisting of upright strips which diverge toward the rear and carry the shovels at their rear extremities, a transverse member connecting said strips, an L-shaped member adjustable on said transverse member, a plate beneath said strips at their point of divergence, a T-shaped member above, a bolt connecting said plate and member to clamp all parts together, and a handle pivoted to said T-shaped member and adjustably attached to said L-shaped member.

In testimony whereof I have hereunto subscribed my signature this the 7th day of November, A. D. 1904.

CHARLES C. KIRKLAND.

Witnesses:
    BROWNELL TOMPKINS,
    H. C. WOOD.